June 5, 1951      A. H. RUSSELL      2,555,660
UNIVERSAL TOGGLE MEANS
Filed Jan. 20, 1948      3 Sheets-Sheet 1
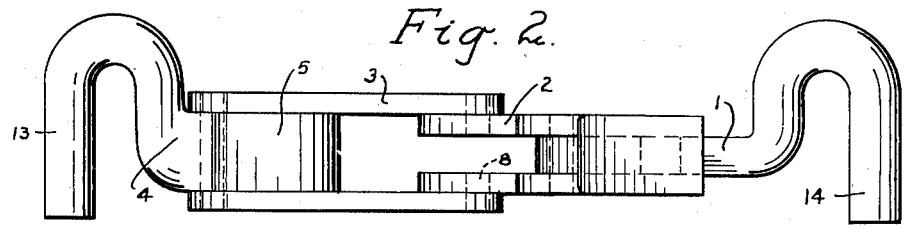
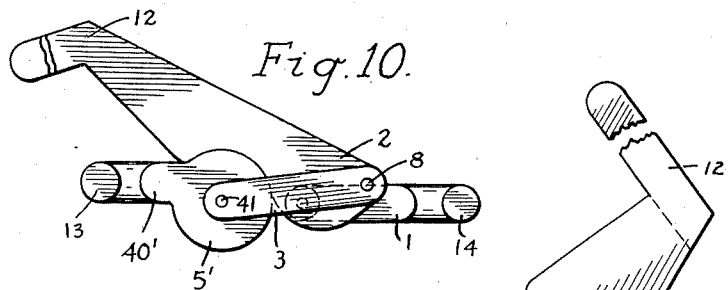
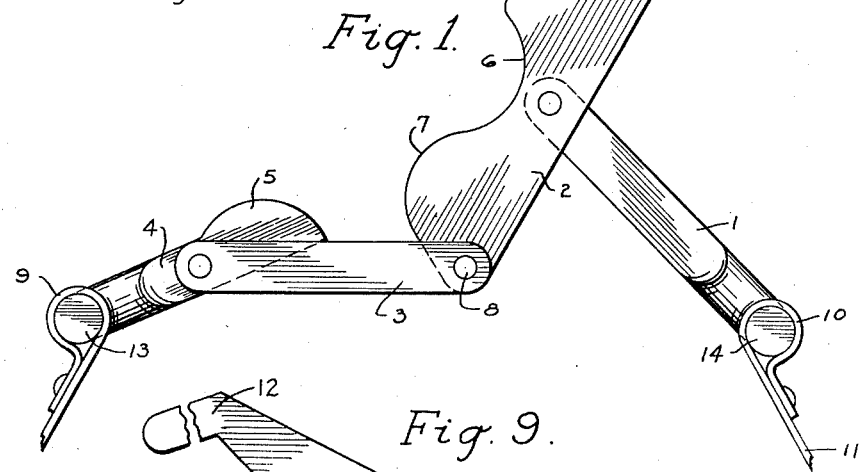
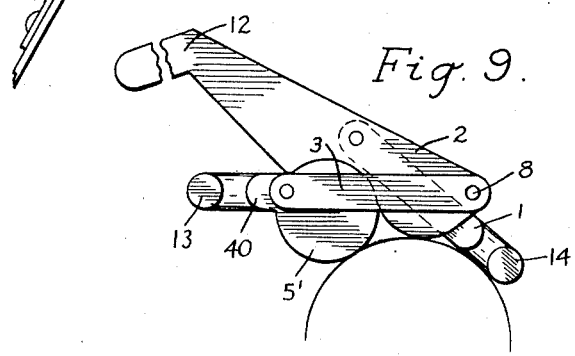
INVENTOR.
ARTHUR H. RUSSELL
BY Bryant & Lowry
Attys.

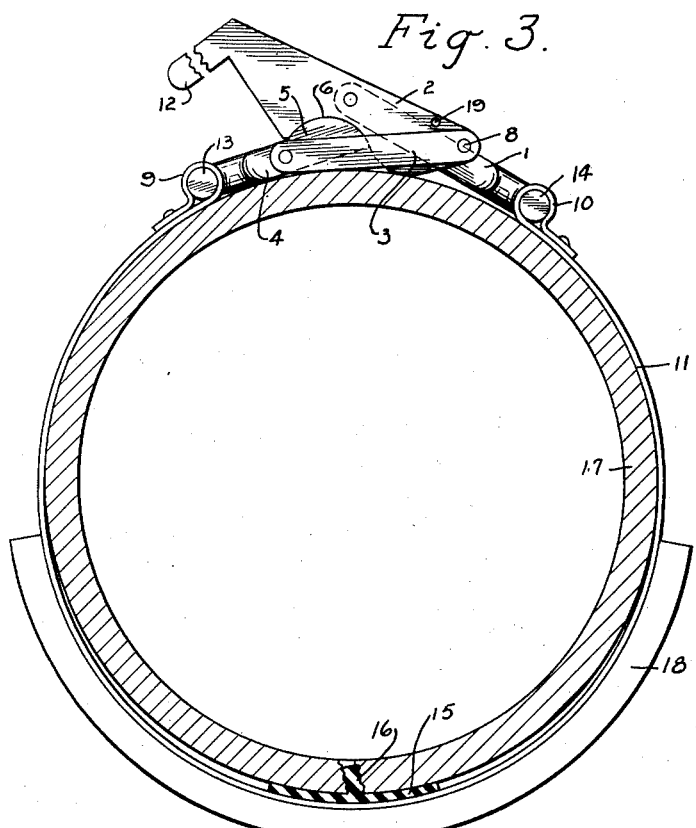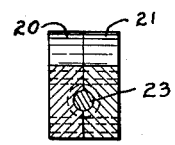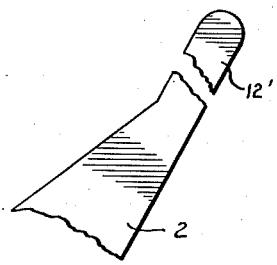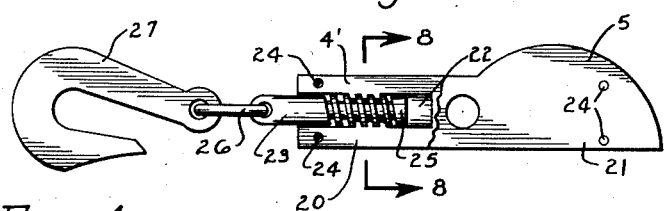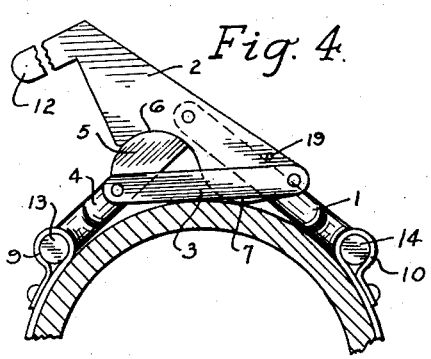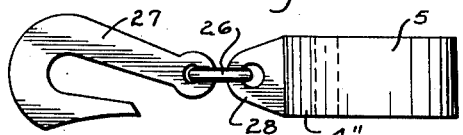

June 5, 1951  A. H. RUSSELL  2,555,660
UNIVERSAL TOGGLE MEANS
Filed Jan. 20, 1948  3 Sheets-Sheet 3
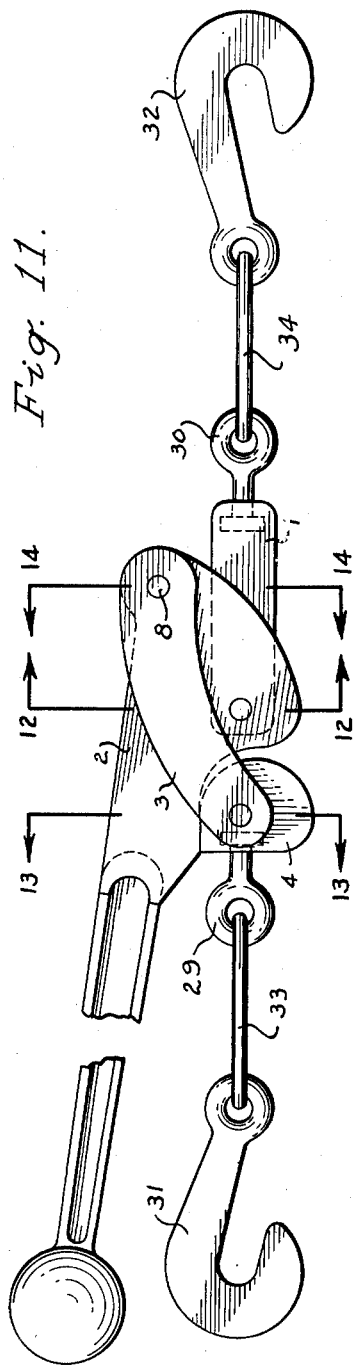
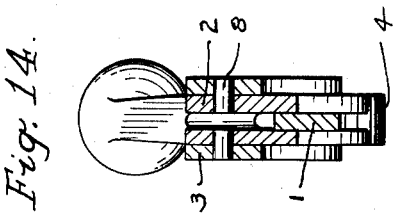
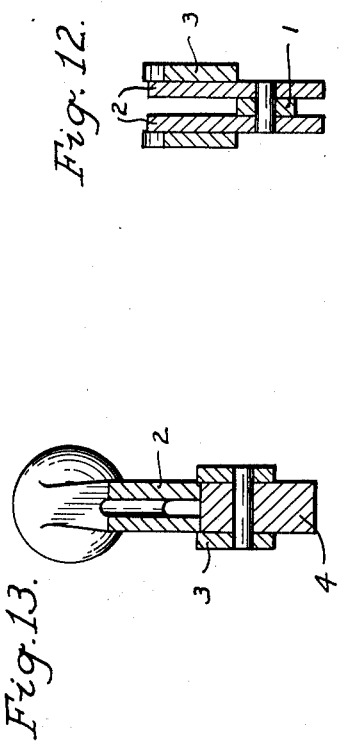
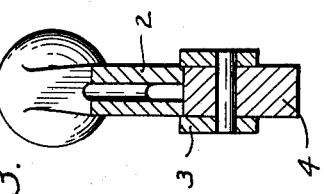
INVENTOR.
ARTHUR H. RUSSELL
BY
Bryant & Lowry
attys.

Patented June 5, 1951

2,555,660

UNITED STATES PATENT OFFICE 2,555,660

UNIVERSAL TOGGLE MEANS

Arthur H. Russell, Fort Worth, Tex.

Application January 20, 1948, Serial No. 3,260

12 Claims. (Cl. 254—78)

This invention relates to improvements in toggle means for pulling together and locking the adjacent ends of a broken line or chain stretched over a flat surface or around a cylindrical or irregular surface; or for pulling together and locking clamp rings placed around a tubular or cylindrical body.

The object of this invention is to provide an improved load-binder, comprising a toggle means with chain or grab hooks attached to its opposite ends for quickly tightening and locking the opposed ends of a broken line or chain over flat or around cylindrical or irregular objects on a load carrier.

Another object is to provide toggle means for quickly clamping a ring tightly around a cylindrical body, such as a pipeline, to hold a leak plug against a leak in the pipeline temporarily, while permanent repairs are being prepared and completed.

Another object is to make this means adjustable for different sizes of pipe and for application of different sizes of plugs, by providing adjustable links therein.

Another object is to make this means self-adjustable for different curvatures of peripheral surfaces against which it may be applied, especially those having small amounts of curvature, including a straight line or perfectly flat surface.

Another object is to make the above clamp toggle means self-locking.

Another object is to provide means for applying a lock to said toggle means to prevent tampering by unauthorized persons or accidental loosening of the toggle.

Another object is to construct a four-link toggle clamp connection wherein the second link has a positioning lobe, the third link is curved, and the fourth link has a cam portion for cooperation with the second link to provide a stop for said second link in its locked position to maintain substantially the same relative position between the first and second links, wherein said first link is moved just past the centerline of said second link, regardless of the curvature of the surface under said toggle connection.

Other and more specific objects will appear in the following detailed description of a toggle means and modified forms thereof, built in accordance with the present invention, having reference to the accompanying drawings, wherein:

Figure 1 is a side view of the clamp toggle means and the ends of the clamp ring affixed thereto, the toggle means being in released position;

Figure 2 is a plan view of the toggle means with the clamp ring removed therefrom;

Figure 3 is a sectional view of a pipeline to which the clamp ring and toggle means is applied and shown in locked position;

Figure 4 is a sectional view of a much smaller pipeline, showing how the cam on the fourth link maintains the locked positions of the first and second links in substantially the same relation as in Figure 3, i. e., with the first link shifted just beyond the centerline of the second link;

Figure 5 shows a modified form of handle which may be used on the end of the second link for certain applications;

Figure 6 is a plan view of a modified form of fourth link which may be used for connection to a chain hook;

Figure 7 is a side view partly in section of still another form of this link, having an adjustable length and adapted for connection to a chain hook;

Figure 8 is a sectional view through the adjustable portion of this link, taken on the line 8—8 of Figure 7;

Figure 9 is a side view of a modified form of toggle means having a completely round cam portion on the fourth link instead of just a segmental cam;

Figure 10 is a side view of another modified form of toggle means having a similarly shaped cam portion on the fourth link but with its pivot shifted to the center of this portion, and providing a much shorter second link; the toggle means being shown in locked position for holding a straight line taut over a flat surface;

Figure 11 is a side elevational view of another form of toggle means, designed for use as a load binder, and Figures 12, 13 and 14 are cross-sectional views taken respectively on lines 12—12, 13—13 and 14—14 of Figure 11.

In addition to providing a toggle means having chain or grab hooks attached to its opposite ends, to afford an improved method of tightening and locking a broken line or chain over flat or around cylindrical or irregular objects, the toggle means disclosed herein may be considered an improvement over the toggle means described in my co-pending application, Serial No. 736,880, filed March 27, 1947, for Leak-Clamp now Patent No. 2,504,881 dated April 18, 1950. The toggle means used in that leak-clamp has to be made in several different sizes to cover the wide variations in pipe diameters normally used in any piping system. The present toggle means, on the other hand, is applicable to all sizes of pipe, because it has a novel construction including a fourth link with a cam portion cooperating with the second link in its closed or locked position to maintain the position of this second link substantially the same with relation to the first link in the locked position, wherein the first link is just inside of the centerline of the second link, regardless of the size of pipe to which it is applied.

The first, second and third links 1, 2 and 3, respectively, correspond to the three links used in the leak-clamp toggle of my copending application referred to above. In the present toggle means, however, there is a fourth link 4 having a configuration as shown, with the cam portion 5 cooperating with the concavity 6 of link 2, so as to form a stop for link 2 in its clamped position, as shown in Figures 3 and 4, in substantially the same relation to the first link, regardless of the large difference in sizes of the pipes on which the toggle means is used. This is made possible by the proper configuration of the second link 2 which has the pipe contact lobe 7 for bringing the pin 8 between links 2 and 3 just outside of link 1 when its concavity 6 strikes the cam portion 5 in the clamping operation, whereby the clamp will be locked without producing any substantial slack after the links pass their centerline positions in drawing the ends 9 and 10 of the clamp ring 11 together by operation of the lever arm 12 of link 2.

Links 1 and 4 have their outer ends turned in the form of pins 13 and 14 respectively which may be readily slipped into the looped ends 9 and 10 of the clamp ring 11.

The clamp ring 11 may be of the type disclosed in the above-mentioned copending application, for clamping a leak plug 15 against and into a leak 16 in pipeline 17 caused by pitting or other causes.

A pipeline that develops a pit-leak is usually weakened by pitting for some distance from said leak as a result of the action of the same agents which finally developed the leak. The soil condition, e. g., which causes the pit leak to occur in the pipe often pits the bottom of the pipe to a lesser extent for a distance of up to one hundred feet or more from said leak. Accordingly, a "half-sole" 18 may be applied over this damaged section of pipe to prevent further corrosion. This is then welded along the sides and ends to form an integral part of the pipe just like the smaller patches or plates placed over the plugged leaks. The "half-sole" usually comes in about twenty-foot sections, each of which may be temporarily supported in place by four or five of the toggle clamps spaced at four or five foot intervals, before the welding is completed.

The two sides of link 2 may be bored as at 19 to permit the use of a padlock for locking the toggle means in locked position, to prevent accidental release, or tampering by unauthorized persons.

In order to adjust for slight differences in length of clamp ring required, the end link, such as link 4, may be made with a threaded adjustable shank as shown in Figure 7. This link 4' has the same configuration as link 4 but is made in two halves 20 and 21 by being split axially, so that the partially threaded bore 22 may be assembled over the threaded portion of shank 23 and then the two halves 20 and 21 may be riveted together as shown at 24. The threaded portion of shank 23 is somewhat longer than the thread in the bore 22 so as to allow a range of adjustment between the parts to change the length of the link. The unthreaded end portion 25 of the shank 23 keeps the shank from being entirely disengaged from the link so that it will not get lost. A chain link 26 may be used to attach a chain hook 27 to the shank 23.

Link 4 may be adapted for connection to a chain hook without having an adjustable length, as shown in Figure 6. Instead of having a turned end portion 13, this link 4" merely has an eyelet end 28 for the chain link 26 to which the chain hook 27 is connected. Link 4 may be provided with swivelled or revolvable eyelet at its outer end, such as shown at 29 in Figure 11, to which chain hook 27 is attached by means of chain link 26. For use with chain clamps, link 1 would also be made with an eyelet end like 28 in Figure 6, and would have a chain hook 27 attached to it by a chain link 26. Link 1 may also have a swivelled or revolvable eyelet at its outer end, similar to that shown at 30 in Figure 11, to which a chain hook may be attached by means of a chain link.

When using an adjustable link 4', if the clamp toggle means moves to a locked position before the clamp ring or chain is entirely snug around the pipe, the chain or ring may be removed from the hook, and the shank 23 turned inwardly to shorten the link 4' sufficiently to make the ring or chain tight when the toggle means is moved to a locked position. Conversely, if the ring or chain is too short to permit moving the toggle means all the way into locked position, the link 4' may be slightly lengthened by unscrewing the shank 23. The pitch of the thread in the adjustable link is sufficiently small to make the thread self-locking so as to prevent any tendency to lengthen the link as a result of the pulling force on shank 23 when the toggle is moved into the locked position.

It may be desirable for some purposes, especially for stretching the ends of two chains or other lines toward each other over a flat surface, to have the operating lever arm extending out straight in line with the link 2, as shown at 12' in Figure 5.

Another modification in the toggle means may be made by using a completely round cam portion 5' on link 40 as shown in Figure 9, instead of just a segmental cam 5. This insures a more positive positioning of the stop for link 2 in its proper relation in accordance with the degree of curvature of the surface over which the toggle means is used.

A further modification may be made as shown in Figure 10, by moving the cam pivot 41 of link 40' to the center of the cam, and shortening the length of link 2' between its pivots. The short second link with substantially the same length of operating arm 12 as in the other forms of toggle means shown, provides more leverage where greater tension is desired. A more concentric location of the cam pivot is permissible in this form by reason of the short second link, because the holding of the relative position between the first and second links substantially constant for different curvatures of surface under the toggle means is not so important since pivot 8 in this case may be moved considerably outside the link 1 without producing any substantial slack in the linkage for the same angular displacement between the first and second links.

Another modification is shown in Figures 11 to 14. The basic construction is the same as in the previously referred to modifications, except as to the shape of link 3, which is curved to facilitate its use over a cylindrical surface. Another distinction is in the use of swivelled or revolvable eyelets 29 and 30 on the outer ends of links 1 and 4 as indicated in Figure 11. A pair of chain hooks 31 and 32 are shown attached to these eyelets by means of chain links 33 and 34. This form of toggle means is particularly adaptable as a load-binder and may be applied, like the other forms, over any type of surface.

In any of the forms of toggle means herein disclosed, if applied over a cylindrical surface, the outer end of link 1 drops and its axis moves farther past pin 8 than when applied over a straight surface, which dropping tends to cause slack, but at the same time the chain hook and swivel joint on link 4 drop also, and the eccentric cam action of link 4 raises link 2 so that the relation of the axis of link 1 and pin 8 remain substantially the same as they would be when the toggle means is applied over a straight surface or when the chain hooks pull in exactly opposite directions, as shown, e. g., in Figure 11.

Many other obvious modifications in the details of this toggle means may be made without departing from the spirit and scope of this invention, as defined in the appended claims.

What is claimed is:

1. A clamp toggle means including, a first link having means for attachment to one end of an article surrounding means, a second link having an operating handle at one end, a third link having one end pivoted to the second link at the end of the latter remote from the handle, a fourth link pivoted to the free end of the third link and having means for attachment to the remaining end of the article surrounding member, said first link having one end pivoted to the second link in spaced relation to the pivot of the third link, and cooperating stop means on said second and fourth links limiting movement of the third link upon the line connecting the pivots of said third link being moved past the line connecting the two pivots of the second link upon completion of movement of the second link to tighten the article encircling member.

2. The clamp toggle means of claim 1 characterized by the fourth link being provided with a cam and the second link provided with a notch wherein said cam engages.

3. The clamp toggle means of claim 2 further characterized by having the fourth link provided with a contact lobe for cooperation with the surface over which said toggle means is operated, whereby the relation of the second and third links is substantially the same in locked position regardless of the curvature of said surface.

4. The clamp toggle means of claim 2 further characterized by having said cam and notch formed as arcs of circles having substantially equal radii.

5. A load binder including, a first link having means on one end for connection to a binding element, a second link having one end pivotally connected to the opposite end of the first link, a third link having one end pivotally connected to the opposite end of the second link, a fourth link having an arcuate periphery and pivotally connected to the opposite end of the third link eccentrically of said arcuate periphery, the fourth link having means for connection to a binding element, and means for swinging the second link with respect to the first link to move the third link toward said first link, said second link having a surface for coacting with the arcuate periphery of the fourth link to limit swinging movement of said second link.

6. A load binder as set forth in claim 5, wherein the second link is provided with an arcuate lobe between its points of pivoting to the first link and the third link, the lobe projecting from the second link to engage a load secured by the load binder.

7. A load binder as set forth in claim 5, wherein the fourth link is provided with an arcuate lobe to engage the load being held by the load binder.

8. A load binder as set forth in claim 5, wherein the third link is curved longitudinally between its points of pivoting to the second link and the fourth link so as to conform to the surface of the load being held by the load binder.

9. In a toggle means for applying tension between binding elements including, a first link adapted to be attached to one binding element, a third link, and a second link pivotally connected to the first and third links and adapted to be swung to move said first and third link together, the improvement which includes, a fourth link pivotally connected to the third link adapted to be attached to a binding element and having an arcuate peripheral portion disposed eccentrically with respect to the pivot point between the third and fourth links, the second link having a surface for coacting with the arcuate peripheral portion of the fourth link to limit the swinging of said second link.

10. In a load binder having three links pivotally connected and means for swinging the second link to move the first and third links together, the improvement which includes a fourth link having a substantially arcuate periphery and being pivotally connected eccentrically to the third link, the second link having a surface for coacting with the arcuate periphery of the fourth link to limit swinging movement of said second link.

11. A load binder as set forth in claim 5 wherein the surface of the second link includes an arcuate recess for receiving the arcuate periphery of the fourth link.

12. In a toggle structure having three links pivotally connected and a handle upon the second link for swinging the latter to move the first and third links together, the improvement which includes a fourth link pivotally connected to the third link and having a cam portion disposed eccentrically substantially about the point of pivoting to the third link, the second link having a surface adjacent and coacting with the cam portion to provide a stop for said second link when the first and third links are moved together, the eccentricity of said cam portion varying the stop position of the second link in accordance with the pivoting of the fourth link relative to the third link.

ARTHUR H. RUSSELL.

REFERENCES CITED

The following references are of record in the file of this patent:

UNITED STATES PATENTS

| Number | Name | Date |
| --- | --- | --- |
| 1,911,194 | Jenkins et al. | May 30, 1933 |
| 2,179,177 | Evans | Nov. 7, 1939 |

FOREIGN PATENTS

| Number | Country | Date |
| --- | --- | --- |
| 6,804 | Sweden | Nov. 14, 1895 |